United States Patent
Kurz, II

(10) Patent No.: US 11,596,136 B2
(45) Date of Patent: Mar. 7, 2023

(54) REACTIVE FISHING ROD HOLDER

(71) Applicant: Thomas Dwight Kurz, II, Hackensack, MN (US)

(72) Inventor: Thomas Dwight Kurz, II, Hackensack, MN (US)

(73) Assignee: Thomas Dwight Kurz, II, Hackensack, MN (US)

(*) Notice: Subject to any disclaimer, the term of this patent is extended or adjusted under 35 U.S.C. 154(b) by 456 days.

(21) Appl. No.: 16/350,362

(22) Filed: Nov. 6, 2018

(65) Prior Publication Data

US 2020/0138000 A1    May 7, 2020

(51) Int. Cl.
*A01K 97/10*    (2006.01)
*A01K 97/01*    (2006.01)
*A01K 97/12*    (2006.01)

(52) U.S. Cl.
CPC .............. *A01K 97/10* (2013.01); *A01K 97/01* (2013.01); *A01K 97/12* (2013.01)

(58) Field of Classification Search
CPC ........ A01K 97/01; A01K 97/10; A01K 97/12; A01K 97/11
USPC ......................................................... 43/21.2
See application file for complete search history.

(56) References Cited

U.S. PATENT DOCUMENTS

| | | | |
|---|---|---|---|
| 3,186,666 A * | 6/1965 | Williams | F16M 7/00 248/529 |
| 3,216,144 A * | 11/1965 | Vojinov | A01K 87/00 43/18.1 R |
| 4,463,511 A | 8/1984 | Copfer | |
| 5,038,511 A | 8/1991 | Gessner | |
| 5,408,779 A * | 4/1995 | Parker | A01K 97/01 43/15 |
| 5,491,923 A * | 2/1996 | Zingrone | A01K 97/01 248/538 |
| D416,071 S * | 11/1999 | Sizer | A01K 97/10 D22/147 |
| 7,322,148 B2 | 1/2008 | Coulman | |
| 7,716,867 B2 | 5/2010 | Dungan | |
| 8,276,310 B1 | 10/2012 | Weber | |
| 9,642,350 B2 * | 5/2017 | Aiello | A01K 97/12 |
| 9,974,294 B2 | 5/2018 | Reiter | |
| 2006/0196101 A1 * | 9/2006 | Mrotek | A01K 97/01 43/21.2 |
| 2009/0241406 A1 * | 10/2009 | Foss | A01K 97/01 43/21.2 |
| 2010/0299988 A1 * | 12/2010 | Robinson | A01K 97/01 43/21.2 |
| 2011/0056112 A1 | 3/2011 | Christianson et al. | |

(Continued)

FOREIGN PATENT DOCUMENTS

| | | | | |
|---|---|---|---|---|
| CA | 2450505 A1 * | 5/2005 | ............ | A01K 97/01 |
| CA | 2525505 A1 * | 5/2007 | ............ | A01K 97/11 |
| CA | 2997458 A1 * | 9/2018 | ........... | A01K 91/065 |

*Primary Examiner* — David J Parsley
*Assistant Examiner* — Danielle A Clerkley

(57) ABSTRACT

An improved fishing rod holder (10) made of wire includes a U-shaped cradle (24) loosely suspended from an arm (20) attached at the upper end of a vertically extending leg (18), the leg is further secured at the bottom end to a base (15). In accordance with the invention the fishing rod holder is especially adapted to be reactive and responsive under the subtle conditions of ice fishing. Second (30) and third (50) embodiments are also disclosed.

1 Claim, 2 Drawing Sheets

(56) References Cited

U.S. PATENT DOCUMENTS

| | | | | |
|---|---|---|---|---|
| 2013/0061512 A1* | 3/2013 | Baker, III | ............... | F16L 3/26 |
| | | | | 248/75 |
| 2014/0366427 A1* | 12/2014 | Baker, III | ............. | A01K 97/10 |
| | | | | 248/75 |
| 2016/0120161 A1* | 5/2016 | Aiello | ................. | A01K 97/01 |
| | | | | 43/16 |
| 2016/0183509 A1* | 6/2016 | Bricko | ................. | A01K 97/10 |
| | | | | 248/534 |
| 2017/0303522 A1* | 10/2017 | Reiter | ................. | A01K 97/10 |

\* cited by examiner

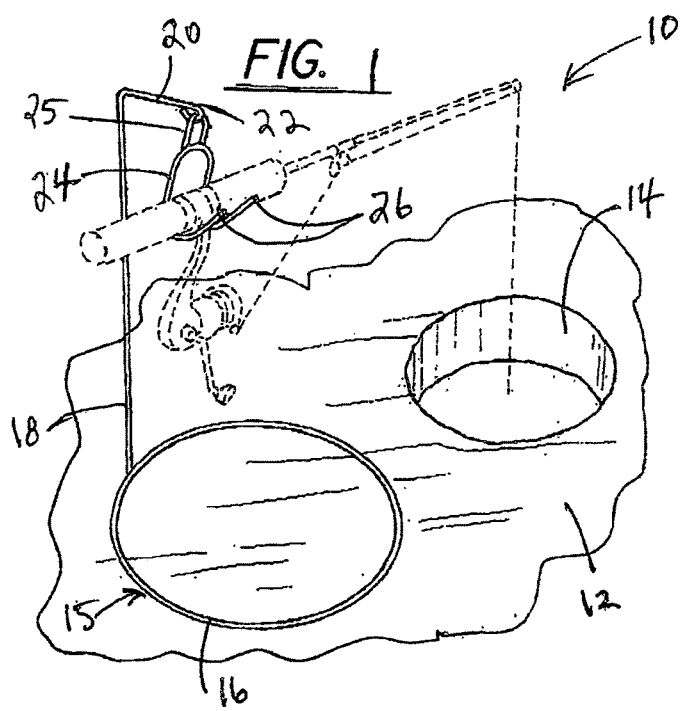
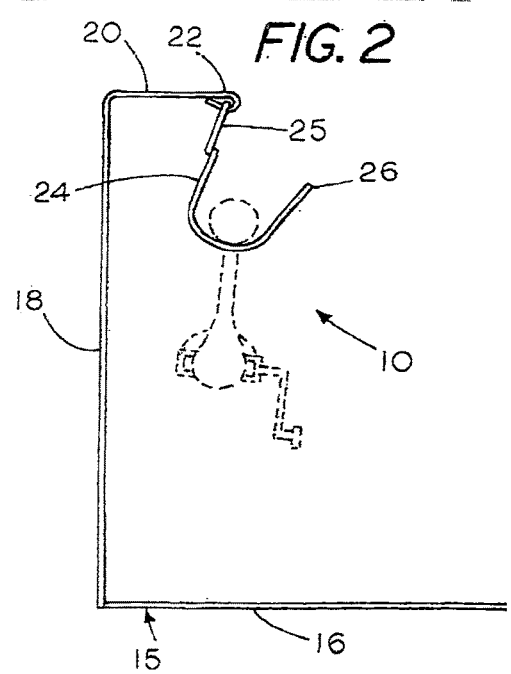
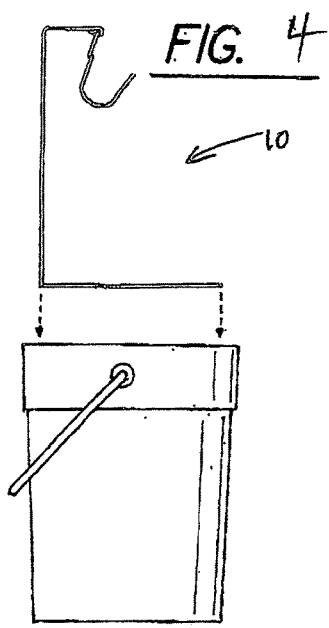
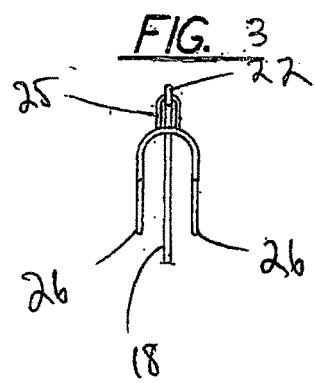

REACTIVE FISHING ROD HOLDER

TECHNICAL FIELD

The present invention relates generally to fishing rod holders, and more particularly to a new and unique reactive fishing rod holder for ice-fishing.

BACKGROUND OF THE INVENTION

Various fishing rod holders have been available heretofore for holding fishing rods. Some are adapted for holding a single rod; others for holding multiple rods at once, either during transport or during fishing. Further, some fishing rod holders are only suitable for use on a boat when fishing on open water, while others may only be suitable for use when fishing off of a dock or from a shoreline instead of on open water.

Fishing rod holders that are particularly adapted for ice fishing have also been available heretofore because the requirements for ice fishing are different. Ice fishing rods tend to be short and light. The line is light. The bait is usually small and light. A different technique is required as well because ice fishing takes place through a hole in the ice while the fisherman sits in a fish house or out in the open on a frozen lake. The fish often tend to be sluggish and less active during the winter, which in turn can make it difficult to determine whether a fish has taken the bait.

U.S. Pat. Nos. 7,322,148 and 5,038,511 are representative of the prior art in this regard. The '148 patent to Coulman shows an ice rigger apparatus in which an indicator flag is released if a fish takes the bait. This is typically known as a tip up.

The '511 patent to Gessner shows a collapsible fishing red holder that is simply adapted to hold the rod off of the ice without any indication whether a fish has taken the bait.

While some ice fishing rod holders of the prior art are responsive to a fish taking the bait and pulling the line down, they are not adapted to indicate when a fish just nudges the bait sideways or even takes it but doesn't pull the line down. The prior fishing rod holders are not sensitive enough to detect this, and even if a bobber is being used and the fisherman is staring right at it, any movement of the bobber could be too subtle for the fisherman to notice.

A need has thus arisen for a new and unique reactive fishing rod holder that is particularly adapted for the conditions of ice fishing.

SUMMARY OF THE INVENTION

The present invention comprises a new and unique fishing rod holder of improved construction which overcomes the foregoing and other difficulties associated with the prior art. In accordance with the invention there is provided a fishing rod holder that is especially adapted to be reactive and responsive under the subtle conditions of ice fishing.

BRIEF DESCRIPTION OF DRAWING

A better understanding of the invention can be had by reference to the following Detailed Description in conjunction with the accompanying Drawing, wherein:

FIG. 1 is a perspective view of the improved fishing rod holder according to a first embodiment of the invention herein.

FIG. 2 is a side view thereof;

FIG. 3 is a partial front view thereof;

FIG. 4 illustrates how the fishing rod holder can be stored in five gallon a bucket;

DETAILED DESCRIPTION

Figure 5:
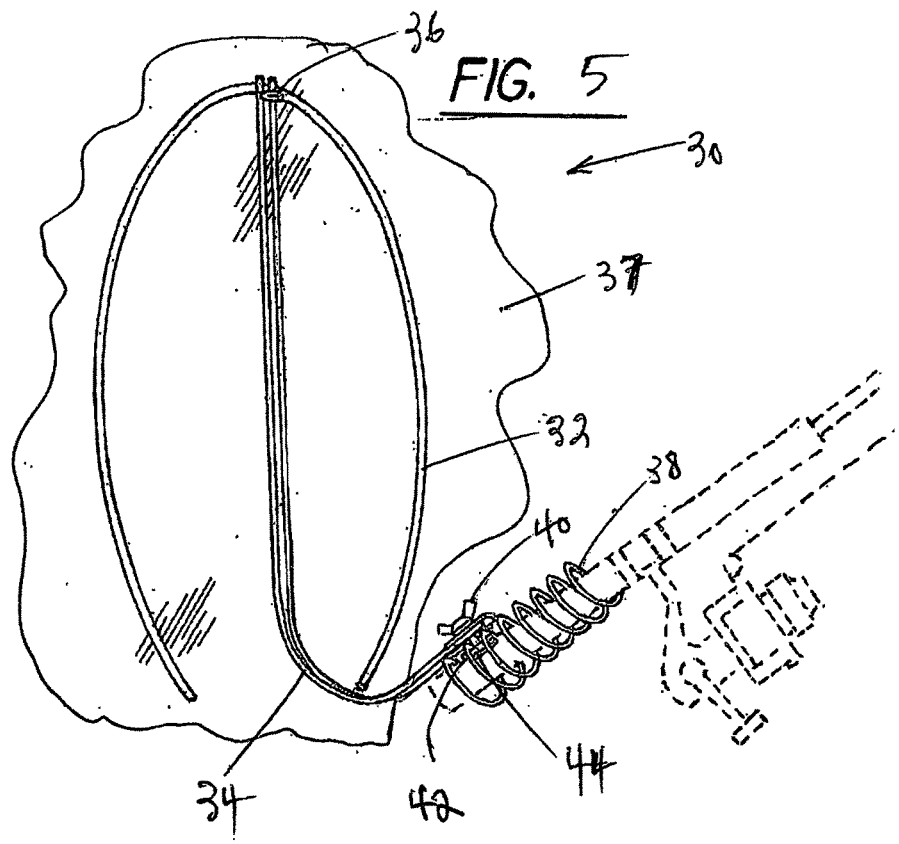
FIG. 5 is a perspective view of the improved fishing rod holder according to a second embodiment of the the invention herein.

Referring now to the Drawing, wherein like reference numerals designate like or corresponding elements throughout the views, with particular reference to FIGS. 1-3, there is shown a fishing rod holder 10 incorporating the invention. As will be explained hereinafter, the holder 10 is of a new and unique construction and is especially adapted to be reactive and responsive under the particular conditions of ice fishing.

FIG. 1 shows holder 10 resting on the ice 12 next to a fishing hole 14, although it could also be set next to a hole in the floor of a fish house over the hole.

The holder 10 includes a base 15 including a generally horizontal foot 16, a generally vertical leg 18 secured to the base, and a generally horizontal arm 20 secured to the top of the leg and extending out over the base. Base 15 can be of any suitable size and shape. In the preferred embodiment foot 16 is circular and made of metal wire about 10 inches in diameter.

The leg 18 is secured to the side foot 16. Similarly leg 18 can be of any suitable size and shape. In the preferred embodiment leg 18 is straight and made of metal wire about 13.50 inches tall in order to fit within a five gallon bucket of the type often used by ice fisherman as shown in FIG. 4.

Arm 20 is secured to the top of leg 18 and extends outwardly base foot 16. In the preferred embodiment arm 20 is straight and made of metal wire about 4.25 inches long. A loop 22 is provided at the end of 20. A second hoop 25 then attaches to cradle for ultimate sensitivity.

A generally U shaped cradle 24 is loosely suspended from hoop 25 on the end of arm 20. Cradle 24 includes a top loop and two laterally spaced apart, upwardly extending fingers 26 for receiving a fishing rod and reel, as shown in phantom lines. In the preferred embodiment, fingers 26 are spaced about 2.50 inches apart to allow space for so that the fishing rod and reel can be balanced horizontally therein.

The fishing rod and reel rests in cradle 24 and can thus be precisely balanced moving as somewhat needed for adjustment between fingers 26 with the line dropping in the water through the ice hole. Since cradle 24 is loosely suspended, it has wide freedom of movement about two axes and can thus tilt down, swing left and or swing right if the fishing line moves even slightly, in order to alert the fisherman.

Figure 6:
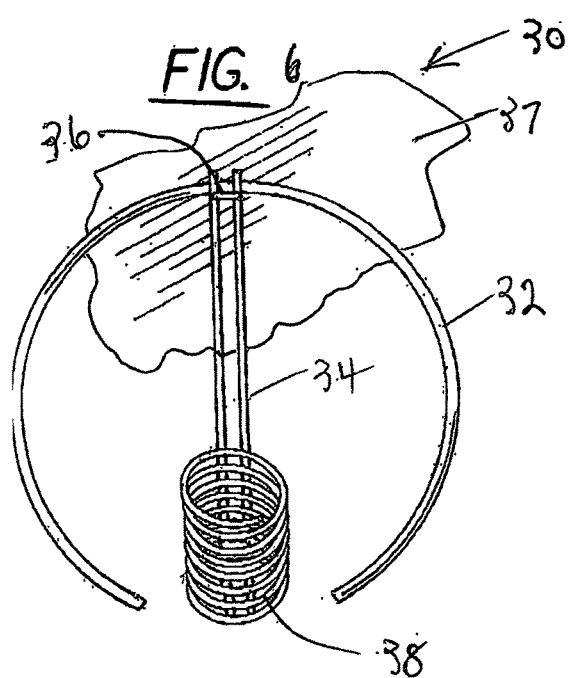
FIG. 6 is a front view thereof.

FIGS. 5 and 6 show a fishing rod holder 30 incorporating a second embodiment of the invention. Holder 30 includes a base 32 and a generally U shaped arm 34 secured at one end to the base. One end of arm 34 is substantially coplanar with the base 32 so that it can either rest directly on ice 12 or be hung from a suitable fastener 36 on the wall 37 of a fish house. Any suitable fastener can be used. In the preferred embodiment, an eyebolt is used for fastener 36 to prevent holder 30 from being pulled away from wall 37.

A hollow compression spring 38 is attached to the end of arm 34. In the preferred embodiment, spring 38 is clamped to arm 34 by means of a nut 40, bolt 42 and washer 44, although the spring could be welded to the arm instead, if desired.

Spring 38 serves as a resilient receiver of the rod end of the fishing rod. Spring 38 is comprised of steel wire of sufficient length in order to retain the end of a fishing rod therein while providing the necessary resilience. In the preferred embodiment, spring 38 is about 4.50 inches long and made from about ten windings or turns of 0.12 inch hard drawn tempered steel wire. The windings or turns of spring 38 are about 1.75 inch in diameter and about 0.25 inch apart.

Figure 7:
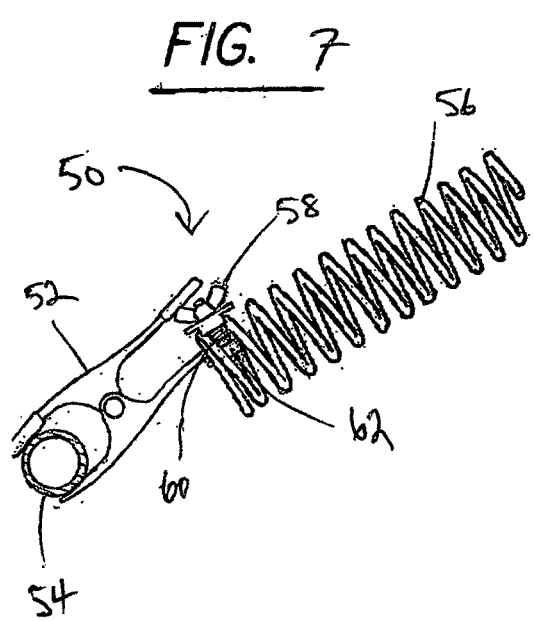
FIG. 7 is a side view of a fishing rod holder according to a third third embodiment of the invention.

FIG. 7 shows a fishing rod holder 50 incorporating a third embodiment of the invention. Instead of a base that can be set down or mounted on a wall, holder 50 includes a spring clamp 52 for convenient attachment to a structural member 54 such as the frame of a collapsible ice fishing enclosure or the like.

Spring 56 is attached to one arm of clamp 42 by means of a nut 58, bolt 60 and washer 62 similarly to holder 30, although it could be welded to the clamp instead, if desired.

Spring 56 is similar to spring 38 except longer for more resilience since clamp 52 is relatively more rigid than arm 34 of holder 30. Spring 56 is comprised of about fourteen spaced apart windings or turns and is about 6.00 inches long, but is otherwise similar to spring 38 in diameter and spacing between the windings. In the preferred embodiment, spring 38 is also made from about 0.12 inch hard drawn tempered steel wire.

From the foregoing, it will be appreciated that the present invention comprises an improved fishing rod holder having several advantages over the prior art. The fishing rod is supported resiliently with more sensitivity in order to react to slight almost imperceptible movement of the line under the subtle conditions of ice fishing. Other advantages will be apparent to those skilled in the art.

Although particular embodiments of the invention have been illustrated in the accompanying Drawing and described in the foregoing Detailed Description, it will be understood that the invention is not limited only to the embodiments disclosed, but is intended to embrace any equivalents, modifications and/or rearrangements of elements falling within the scope of the invention as defined by the following Claims.

What is claimed is:

1. A fishing rod and reel holder consisting of:
   a base made of metal wire forming a continuous circle;
   a support leg made of metal wire, the support leg consisting of:
      a vertical rod with a top end and a bottom end, wherein the bottom end of the vertical rod is directly secured to the base, and
      a horizontal rod with a first end and a second end, wherein the first end of the horizontal rod is directly secured to and forms a substantially right angle with the top end of the vertical rod, wherein the horizontal rod extends over the base, wherein the second end of the horizontal rod is bent forming an opening;
   a U-shaped cradle consisting of:
      a top log directly suspended from the opening, and
      a continuous wire bent forming two spaced apart upwardly extending fingers, the continuous wire directly secured to the top loop such that the cradle is configured to selectively balance a fishing rod and reel in a raised position above the base.

* * * * *